United States Patent
Bae

(10) Patent No.: US 9,773,609 B2
(45) Date of Patent: Sep. 26, 2017

(54) POWER SUPPLY APPARATUS AND POWER CONTROL METHOD THEREOF

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1118 days.

(21) Appl. No.: 13/902,141

(22) Filed: May 24, 2013

(65) Prior Publication Data

US 2013/0313911 A1 Nov. 28, 2013

(30) Foreign Application Priority Data

May 25, 2012 (KR) ........................ 10-2012-0056359

(51) Int. Cl.
*H02J 17/00* (2006.01)
*H01F 38/14* (2006.01)
*H02J 5/00* (2016.01)
*H02J 7/02* (2016.01)

(52) U.S. Cl.
CPC .............. *H01F 38/14* (2013.01); *H02J 5/005* (2013.01); *H02J 7/025* (2013.01)

(58) Field of Classification Search
CPC .............. H02J 17/00; H02J 50/10; H02J 50/12
See application file for complete search history.

(56) References Cited

U.S. PATENT DOCUMENTS

| | | | | |
|---|---|---|---|---|
| 4,665,896 A | * | 5/1987 | LaForge | A61M 1/1086 600/17 |
| 5,314,453 A | * | 5/1994 | Jeutter | A61N 1/3787 607/60 |
| 5,690,693 A | * | 11/1997 | Wang | A61N 1/3787 607/61 |
| 2012/0038218 A1 | * | 2/2012 | Ichikawa | H02J 5/005 307/97 |

FOREIGN PATENT DOCUMENTS

| | | |
|---|---|---|
| JP | 2000-166129 | 6/2000 |
| JP | 2004-248365 | 9/2004 |
| JP | 2012-005238 | 1/2012 |

OTHER PUBLICATIONS

Machine translation for JP2004-248365 from ESPACENET (Sep. 17, 2016).*
Office Action dated Jan. 15, 2014 in Korean Application No. 10-2012-0056359.

* cited by examiner

*Primary Examiner* — Fritz M Fleming
(74) *Attorney, Agent, or Firm* — Saliwanchik, Lloyd & Eisenschenk

(57) ABSTRACT

Disclosed is a power supply apparatus of a wireless power transmitting apparatus wirelessly transmitting power to a wireless power receiving apparatus. The power supply apparatus includes a power supply to supply DC power, an oscillator to generate an AC signal having a predetermined frequency and an AC power generator to generate AC power (Continued)

using the AC signal and the DC power. The power supply apparatus controls an operating time of the AC power generator to adjust the power supplied to the wireless power transmitting apparatus.

7 Claims, 5 Drawing Sheets

POWER SUPPLY APPARATUS AND POWER CONTROL METHOD THEREOF

CROSS-REFERENCE TO RELATED APPLICATION

This application claims the benefit under 35 U.S.C. §119 of Korean Patent Application No. 10-2012-0056359, filed May 25, 2012, which is hereby incorporated by reference in its entirety.

BACKGROUND

The disclosure relates to a wireless power transmission technology. More particularly, the disclosure relates to a power supply apparatus capable of maximizing a power transmission efficiency upon wireless power transmission and a power control method thereof.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance thereof is short.

Until now, wireless energy transmission schemes include a remote telecommunication technology based on resonance and a short wave radio frequency in addition to the electromagnetic induction.

In a wireless power transmitting system employing resonance, since an electrical signal generated between the transmitting side and the receiving side is wirelessly transferred through coils, a user may easily charge electronic appliances such as a portable device and the power transmission distance may be expanded.

However, a power supply apparatus that supplies power to a wireless power transmitting apparatus according to the related art represents problems in terms of heat generation, increase of material cost and power loss due to a DC-DC converter.

BRIEF SUMMARY

The disclosure provides a power supply apparatus capable of maximizing the power transmission efficiency without using a DC-DC converter by adjusting transmitted power according to the state of wireless power transmission and a power control method thereof.

The disclosure provides a power supply apparatus capable of maximizing the power transmission efficiency by adjusting transmitted power according to the state of wireless power transmission by controlling a dead time of an AC signal and a power control method thereof.

The disclosure provides a power supply apparatus capable of reducing the material cost and solving the heat-generation problem without using a DC-DC converter by adjusting transmitted power according to the state of wireless power transmission and a power control method thereof.

According to the embodiment, there is provided a power supply apparatus of a wireless power transmitting apparatus wirelessly transmitting power to a wireless power receiving apparatus. The power supply apparatus may include a power supply to supply DC power, an oscillator to generate an AC signal having a predetermined frequency and an AC power generator to generate AC power using the AC signal and the DC power, wherein the power supply apparatus controls an operating time of the AC power generator to adjust the power supplied to the wireless power transmitting apparatus.

The power supply apparatus may adjust the operating time of the AC power generator based on a coupling state between the wireless power transmitting apparatus and the wireless power receiving apparatus wirelessly receiving the power from the wireless power transmitting apparatus.

The power supply apparatus may increase the power supplied to the wireless power transmitting apparatus by adjusting the operating time when a magnetic coupling between the wireless power transmitting apparatus and the wireless power receiving apparatus is reduced, and may reduce the power supplied to the wireless power transmitting apparatus by adjusting the operating time when the magnetic coupling between the wireless power transmitting apparatus and the wireless power receiving apparatus is increased.

The AC power generator may include a first MOSFET, a second MOSFET and a driver applying AC signals having a same amplitude and opposite phases to the first MOSFET and the second MOSFET, respectively, and the driver may adjust a time during which the AC signal of a low level is applied to both of the first MOSFET and the second MOSFET.

The operating time may be a time during which one of AC signals applied to the first MOSFET and the second MOSFET has a high level to supply the power to the wireless power transmitting apparatus.

The AC power generator may include a first MOSFET, a second MOSFET and a driver applying AC signals having a same amplitude and opposite phases to the first MOSFET and the second MOSFET, respectively, and the driver may adjust a time during which the AC signal of a high level is applied to both of the first MOSFET and the second MOSFET.

The power supply apparatus may reduce the time during which the AC signal of the low level is applied to both of the first MOSFET and the second MOSFET when the magnetic coupling between the wireless power transmitting apparatus and the wireless power receiving apparatus is reduced, and may increase the time during which the AC signal of the low level is applied to both of the first MOSFET and the second MOSFET when the magnetic coupling between the wireless power transmitting apparatus and the wireless power receiving apparatus is increased.

The power supply apparatus may further include a power transmissions state detector to detect the coupling state.

The power transmissions state detector may include a current sensor to measure current flowing through the power supply apparatus, and the current flowing through the power supply apparatus may be one of current applied to the AC power generator and current output from the AC power generator.

The power supply apparatus may increase the time during which the AC signal of the low level is applied to both of the first MOSFET and the second MOSFET when a measured intensity of current is increased.

The power supply apparatus may reduce the time during which the AC signal of the low level is applied to both of the first MOSFET and the second MOSFET when a measured intensity of current is reduced.

The power supply apparatus may adjust the operating time according to variation of current flowing through the power supply apparatus.

The embodiment of the disclosure has effects as follows.

The power transmission efficiency can be maximized without using a DC-DC converter by adjusting transmitted power according to the wireless power transmission state.

According to the disclosure, the power transmission efficiency can be maximized by adjusting transmitted power according to the wireless power transmission state by controlling a dead time of an AC signal.

According to the disclosure, the material cost can be reduced and the heat-generation problem can be solved without using a DC-DC converter by adjusting transmitted power according to the wireless power transmission state.

Meanwhile, other effects of the disclosure will be disclosed directly or indirectly in the detailed description of the disclosure to be described later.

DETAILED DESCRIPTION

Hereinafter, embodiments will be described in detail with reference to accompanying drawings so that those skilled in the art can easily work with the embodiments.

Figure 1:
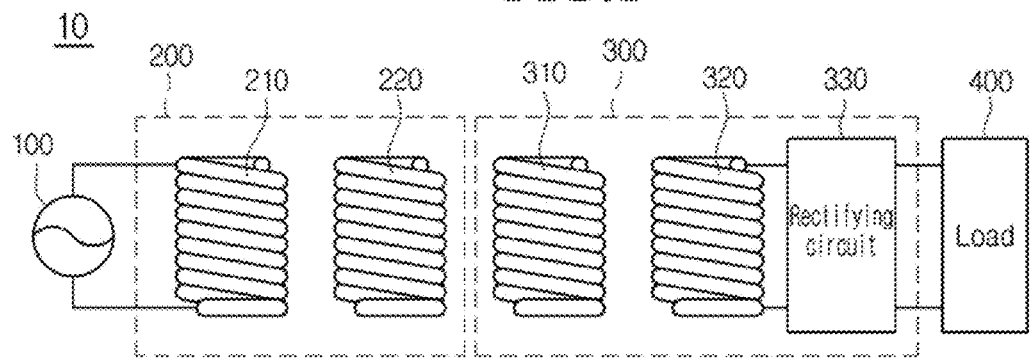
FIG. 1 is a view showing a wireless power transmission system according to one embodiment.

FIG. 1 is a view showing a wireless power transmission system according to one embodiment.

Referring to FIG. 1, the wireless power transmission system 10 may include a power supply apparatus 100, a wireless power transmitting apparatus 200, a wireless power receiving apparatus 300 and a load 400.

According to one embodiment, the power supply apparatus 100 may be included in the wireless power transmitting apparatus 200.

The wireless power transmitting apparatus 200 may include a transmission induction coil 210 and a transmission resonant coil 220.

The wireless power receiving apparatus 300 may include a reception resonant coil 310, a reception induction coil 320, a rectifying unit 330 and the load 400.

Both terminals of the power supply apparatus 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying unit 330, and the load 400 is connected to both terminals of the rectifying unit 330. According to one embodiment, the load 400 may be included in the wireless power receiving apparatus 300.

The power generated from the power supply apparatus 100 is transmitted to the wireless power transmitting apparatus 200. The power received in the wireless power transmitting apparatus 200 is transmitted to the wireless power receiving apparatus 300 that makes resonance with the wireless power transmitting apparatus 200 due to a resonance phenomenon, that is, has the resonance frequency the same as that of the wireless power transmitting apparatus 200.

Hereinafter, the power transmission process will be described in more detail.

The power supply apparatus 100 generates AC power having a predetermined frequency and transmits the AC power to the wireless power transmitting apparatus 200.

The transmission induction coil 210 and the transmission resonant coil 220 are inductively coupled with each other. In other words, if AC current flows through the transmission induction coil 210 due to the power received from the power supply apparatus 100, the AC current is induced to the transmission resonant coil 220 physically spaced apart from the transmission induction coil 210 due to the electromagnetic induction.

Thereafter, the power received in the transmission resonant coil 220 is transmitted to the wireless power receiving apparatus 300, which makes a resonance circuit with the wireless power transmitting apparatus 200, through resonance.

Power can be transmitted between two LC circuits, which are impedance-matched with each other, through resonance. The power transmitted using the resonance can be farther transmitted with higher efficiency when comparing with the power transmitted by the electromagnetic induction.

The reception resonant coil 310 receives power from the transmission resonant coil 220 using the resonance. The AC current flows through the reception resonant coil 310 due to the received power. The power received in the reception resonant coil 310 is transmitted to the reception induction coil 320, which is inductively coupled with the reception resonant coil 310, due to the electromagnetic induction. The power received in the reception induction coil 320 is rectified by the rectifying unit 330 and transmitted to the load 400.

The transmission resonant coil 220 of the wireless power transmitting apparatus 200 may transmit power to the reception resonant coil 310 of the wireless power receiving apparatus 300 through a magnetic field.

In detail, the transmission resonant coil 220 and the reception resonant coil 310 are resonance-coupled with each other so that the transmission resonant coil 220 and the reception resonant coil 310 operate at a resonance frequency.

The resonance-coupling between the transmission resonant coil 220 and the reception resonant coil 310 can significantly improve the power transmission efficiency between the wireless power transmitting apparatus 200 and the wireless power receiving apparatus 300.

A quality factor and a coupling coefficient are important in the wireless power transmission.

The quality factor may refer to an index of energy that may be stored in the vicinity of the wireless power transmitting apparatus or the wireless power receiving apparatus.

The quality factor may vary according to the operating frequency ω as well as a shape, a dimension and a material of a coil. The quality factor may be expressed as following equation, Q=ω*L/R. In the above equation, L refers to the inductance of a coil and R refers to resistance corresponding to the quantity of power loss caused in the coil.

The quality factor may have a value of 0 to infinity.

The coupling coefficient represents the degree of magnetic coupling between a transmission coil and a reception coil, and has a value in the range of 0 to 1.

The coupling coefficient may vary according to the alignment position and distance between the transmission coil and the reception coil.

Figure 2:
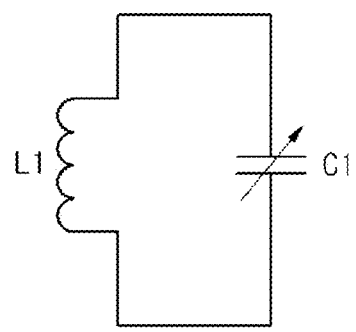
FIG. 2 is a circuit diagram showing an equivalent circuit of the transmission induction coil according to the one embodiment.

FIG. 2 is a circuit diagram showing an equivalent circuit of the transmission induction coil 210 according to the one embodiment.

As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the capacitance of the capacitor C1. The equivalent circuit of each of the transmission resonant coil 220, the reception resonant coil 310 and the reception induction coil 320 may be the same as the equivalent circuit shown in FIG. 2.

Figure 3:
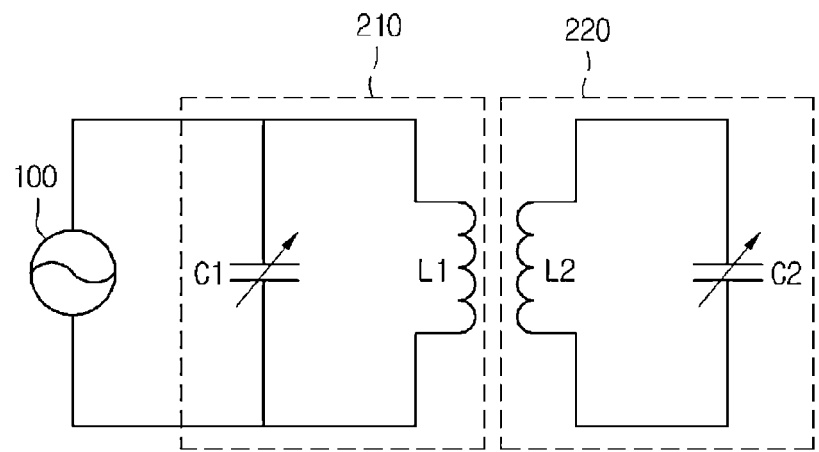
FIG. 3 is a circuit diagram showing an equivalent circuit of a power supply apparatus and a wireless power transmitting apparatus according to one embodiment.

FIG. 3 is a circuit diagram showing an equivalent circuit of the power supply apparatus 100 and the wireless power transmitting apparatus 200 according to one embodiment.

As shown in FIG. 3, the transmission induction coil 210 includes the inductor L1 having predetermined inductance and a capacitor C1 having predetermined capacitance. The transmission resonant coil 220 includes an inductor L2 having predetermined inductance and a capacitor C2 having predetermined capacitance.

Figure 4:
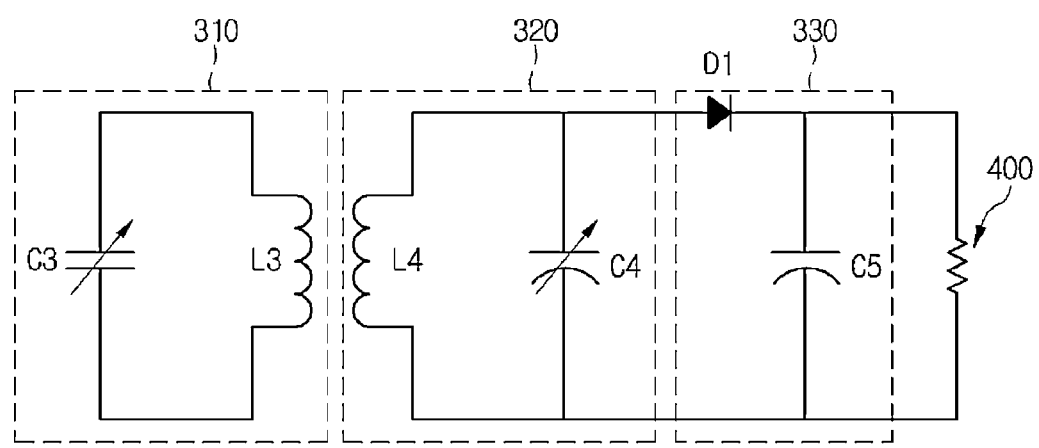
FIG. 4 is a circuit diagram showing an equivalent circuit of a wireless power receiving apparatus according to one embodiment.

FIG. 4 is a circuit diagram showing an equivalent circuit of the wireless power receiving apparatus 300 according to one embodiment.

As shown in FIG. 4, the reception resonant coil 310 includes an inductor L3 having predetermined inductance and a capacitor C1 having predetermined capacitance. The reception induction coil 320 includes an inductor L4 having predetermined inductance and a capacitor C4 having predetermined capacitance.

The rectifying unit 330 may include a diode D1 and a rectifying capacitor C5 to output DC power by converting AC power into the DC power.

The rectifying unit 330 may include a rectifier and a smoothing circuit. A silicon rectifier may be used as a rectifying element of the rectifier.

The smoothing circuit may smooth the output of the rectifier.

The load 400 may be a predetermined rechargeable battery or a device requiring the DC power. For example, the load 400 may refer to a battery.

The wireless power receiving apparatus 300 may be installed in an electronic device, such as a cellular phone, a laptop computer or a mouse, requiring the power.

The wireless power transmitting apparatus 200 may adjust power transmitted to the wireless power receiving apparatus 300 through in-band communication.

The in-band communication refers to the communication for interchanging information between the wireless power transmitting apparatus 200 and the wireless power receiving apparatus 300 through a signal having the frequency used in the wireless power transmission. The wireless power receiving apparatus 300 may receive or may not receive power transmitted from the wireless power transmitting apparatus 200 through a switching operation. Accordingly, the wireless power transmitting apparatus 200 can recognize an on-signal or an off-signal of the wireless power receiving apparatus 300 by detecting the quantity of power consumed in the wireless power transmitting apparatus 200.

In detail, the wireless power receiving apparatus 300 may change the power consumed in the wireless power transmitting apparatus 200 by adjusting the quantity of power absorbed in a resistor by using the resistor and the switch. The wireless power transmitting apparatus 200 may acquire the state information of the wireless power receiving apparatus 300 by detecting the variation of the power consumption.

In more detail, if the switch is open, the power absorbed in the resistor becomes zero, and the power consumed in the wireless power transmitting apparatus 200 is reduced.

If the switch is short-circuited, the power absorbed in the resistor becomes greater than zero, and the power consumed in the wireless power transmitting apparatus 200 is increased. If the wireless power receiving apparatus repeats the above operation, the wireless power transmitting apparatus 200 detects power consumed therein to make digital communication with the wireless power receiving apparatus 300.

The wireless power transmitting apparatus 200 receives the state information of the wireless power receiving apparatus 300 through the above operation so that the wireless power transmitting apparatus 200 can transmit appropriate power.

To the contrary, the wireless power transmitting apparatus 200 may include a resistor and a switch to transmit the state information of the wireless power transmitting apparatus 200 to the wireless power receiving apparatus 300.

Hereinafter, the method of controlling power supplied from the power supply apparatus 100 to the wireless power transmitting apparatus according to one embodiment will be described with reference to FIGS. 5 to 7.

Figure 5:
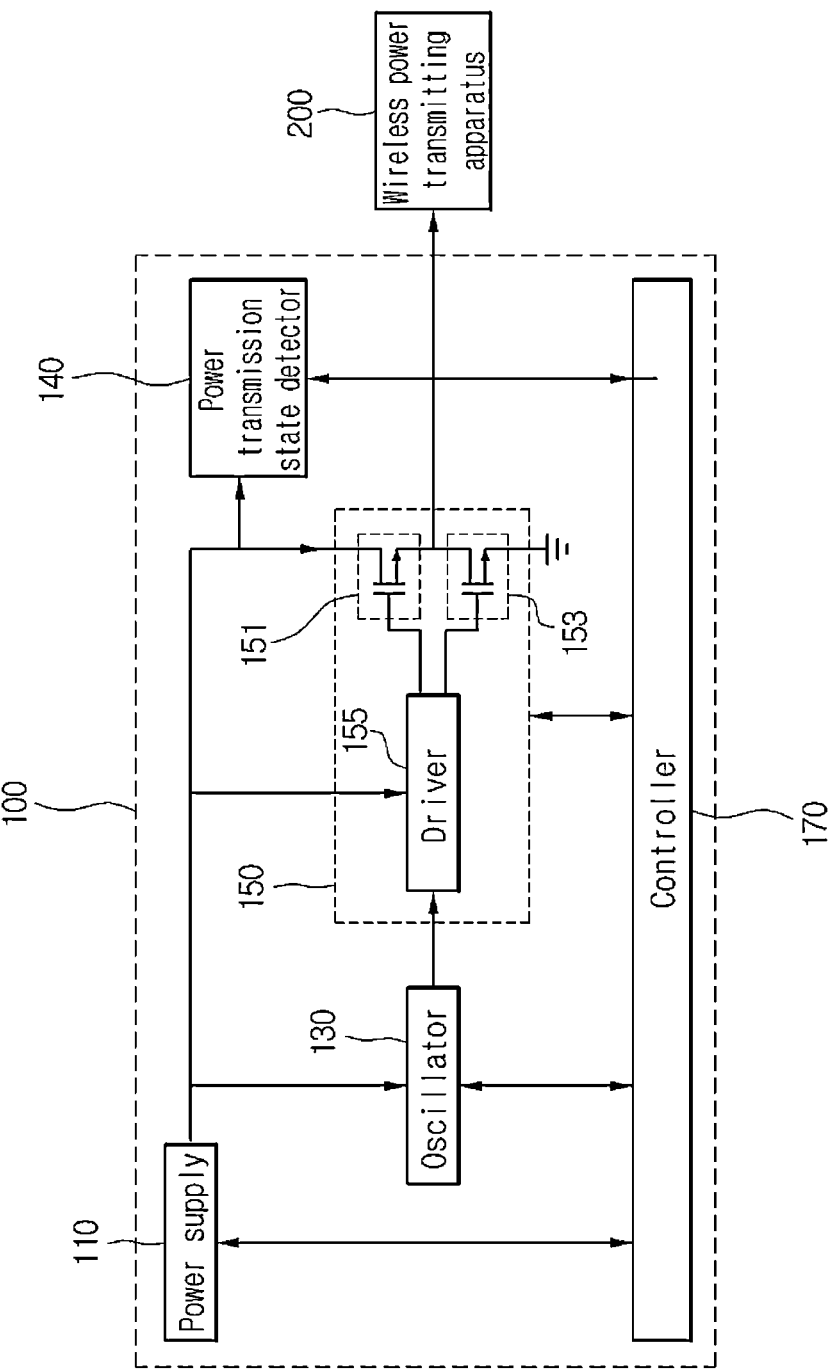
FIG. 5 is a view showing a structure of a power supply apparatus according to one embodiment.
Figure 6:
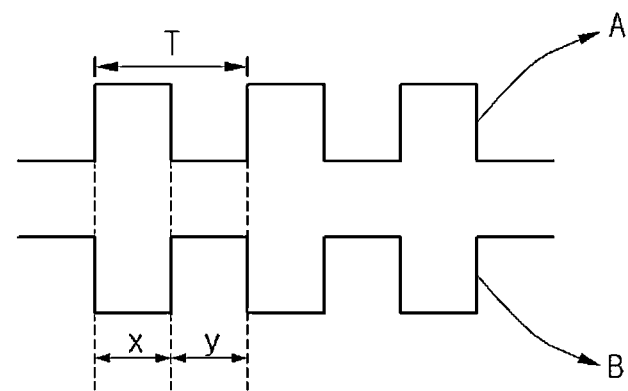
FIG. 6 is a view showing a waveform of an AC signal applied to a first MOSFET and a second MOSFET without a dead time.
Figure 7:
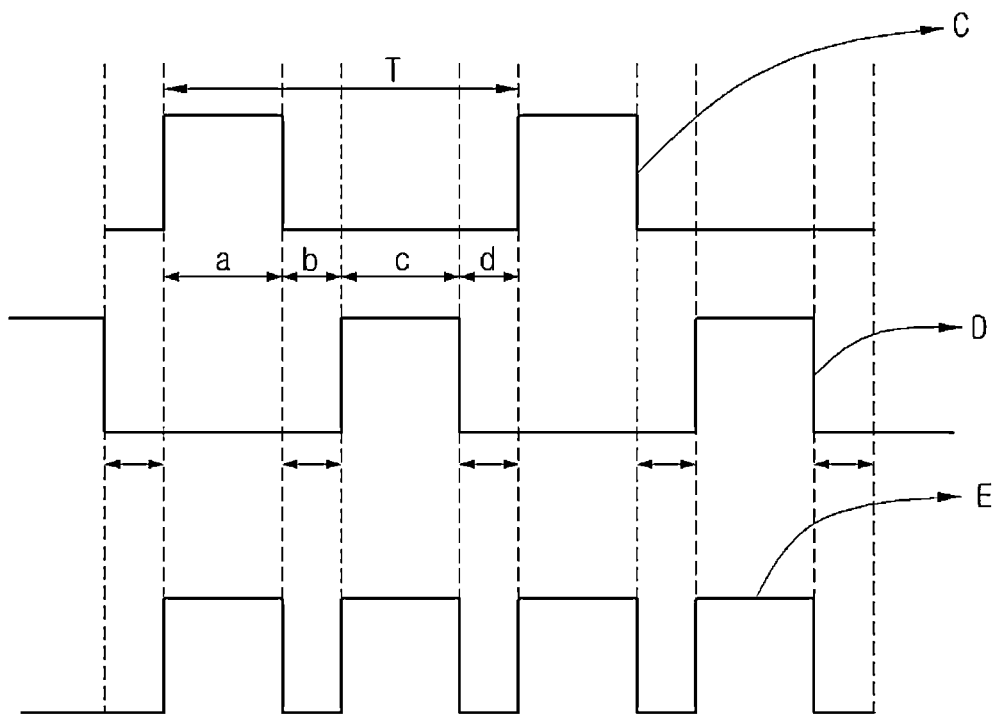
FIG. 7 is a view showing a waveform of an AC signal applied to a first MOSFET and a second MOSFET when a dead time is set.

FIG. 5 is a view showing a structure of the power supply apparatus 100 according to one embodiment, FIG. 6 is a view showing a waveform of an AC signal applied to a first MOSFET 151 and a second MOSFET 153 without a dead time, and FIG. 7 is a view showing a waveform of an AC signal applied to the first MOSFET 151 and the second MOSFET 153 when the dead time is set.

Referring to FIG. 5, the power supply apparatus 100 includes a power supply 110, an oscillator 130, a power transmission state detector 140, an AC power generator 150, and a controller 170.

The power supply apparatus 100 may be included in either the wireless power transmitting apparatus 200 or the wireless power transmitting apparatus 300.

The power supply 110 may supply the DC power to each component of the power supply apparatus 100. According to one embodiment, the power supply 110 may supply the DC power of 19 V, but this is illustrative purpose only.

The power supply apparatus 100 converts the DC power received from the power supply 110 into the AC power and supplies the AC power to the wireless power transmitting apparatus 200.

According to one embodiment, if the wireless power transmitting apparatus 200 transmits the power to the wireless power receiving apparatus 300 using the resonance, the wireless power transmitting apparatus 200 may include the transmission induction coil 210 and the transmission resonant coil 220. However, if the wireless power transmitting apparatus 200 transmits the power to the wireless power receiving apparatus 300 using the electromagnetic induction, the wireless power transmitting apparatus 200 may include only the transmission induction coil 210.

The oscillator 130 generates an AC signal having a predetermined frequency to output the AC signal to the AC power generator 150.

According to one embodiment, if the wireless power transmitting apparatus 200 transmits the power to the wireless power receiving apparatus 300 using the resonance, the predetermined frequency may be the resonance frequency. That is, the oscillator 130 may generate the AC signal having the resonance frequency to output the AC signal to the AC power generator 150 such that the power transmission is enabled between the wireless power transmitting apparatus 200 and the wireless power receiving apparatus 300 at the resonance frequency.

According to one embodiment, if the wireless power transmitting apparatus 200 transmits the power to the wireless power receiving apparatus 300 using the electromagnetic induction, the oscillator 130 may control the power supplied to the wireless power transmitting apparatus 200 by adjusting the frequency. That is, when it is necessary for the wireless power transmitting apparatus 200 to reduce or increase power transmitted to the wireless power receiving apparatus 300, the oscillator 130 generates the AC signal having the adjusted frequency and outputs the AC signal to the AC power generator 150. When the power transmission is carried out through the electromagnetic induction, the oscillator 130 can adjust the power supplied to the wireless power transmitting apparatus 200 by controlling the frequency in order to adjust the power transmitted to the wireless power receiving apparatus 300.

The power transmission state detector 140 may detect a power transmission state between the wireless power transmitting apparatus 200 and the wireless power transmitting apparatus 300. According to one embodiment, the power transmission state detector 140 may detect the coupling state between the wireless power transmitting apparatus 200 and the wireless power transmitting apparatus 300 by detecting the power transmission state. The coupling state may refer to at least one of a distance or an alignment position between the wireless power transmitting apparatus 200 and the wireless power transmitting apparatus 300.

According to one embodiment, the power transmission state detector 140 may detect the power transmission state by sensing current flowing inside the power supply apparatus 100. To this end, a current sensor may be used. The current sensor can measure the current flowing inside the power supply apparatus 100 and the coupling state between the wireless power transmitting apparatus 200 and the wireless power transmitting apparatus 300 can be detected based on the measured current. The coupling state may be represented as a coupling coefficient between the transmission resonant coil 220 of the wireless power transmitting apparatus 200 and the reception resonant coil 310 of the wireless power transmitting apparatus 300.

The current sensor may detect the current input into the AC power generator 150 and measure the intensity of the measured current, but the embodiment is not limited thereto. For instance, the current sensor may measure the current flowing inside the power supply apparatus 100, such as current output from the AC power generator 150.

In addition, a current transformer (CT) may be used as the current sensor. The intensity of current measured by the current sensor may vary depending on the power transmission state between the wireless power transmitting apparatus 200 and the wireless power transmitting apparatus 300. According to one embodiment, the power transmission efficiency may vary depending on the distance and direction between the wireless power transmitting apparatus 200 and the wireless power transmitting apparatus 300.

Further, the intensity of current measured by the current sensor may relate to the coupling coefficient between the transmission resonant coil 220 of the wireless power transmitting apparatus 200 and the reception resonant coil 310 of the wireless power transmitting apparatus 300. The coupling coefficient refers to the degree of magnetic coupling between the transmission resonant coil 220 and the reception resonant coil 310, and has a value in the range of 0 to 1. If the power transmission is carried out through the electromagnetic induction, other that the resonance, the intensity of current measured by the current sensor may relate to the coupling coefficient between the transmission induction coil 210 and the reception induction coil 320.

For instance, as the intensity of current applied to the AC power generator 150 becomes increased, the distance between the wireless power transmitting apparatus 200 and the wireless power transmitting apparatus 300 becomes closer. At this time, the coupling coefficient is increased as the intensity of the current is increased. In contrast, as the intensity of current applied to the AC power generator 150 becomes reduced, the distance between the wireless power transmitting apparatus 200 and the wireless power transmitting apparatus 300 becomes far away. At this time, the coupling coefficient is reduced as the intensity of the current is increased.

The AC power generator 150 receives the DC power from the power supply 110 and generates the AC power by using the AC signal output from the oscillator 130 to transmit the AC power to the wireless power transmitting apparatus 200.

The AC power generator 150 may amplify and output the AC signal output from the oscillator 130. Since intensity of the AC signal output from the oscillator 130 may be small, the AC power generator 150 further includes an amplifying buffer to amplify the AC signal output from the oscillator 130 to a predetermined level.

The AC power generator 150 may have a push-pull type structure. According to the push-pull type structure, pairs of switches, transistors or predetermined circuit blocks are alternately operated to alternately represent the response at the output side. Since the circuit block pairs are alternately operated as if they pull or push each other, it is called a 'push-pull structure'.

The AC power generator 150 may include a first MOSFET 151, the second MOSFET 153 and a driver 155.

The driver 155 receives the AC signal having the predetermined frequency from the oscillator 130. According to one embodiment, the AC signal is a rectangular wave signal.

The driver 155 may apply the AC signals having the same intensity and opposite phases to the first MOSFET 151 and the second MOSFET 153, respectively. As the AC signals having the opposite phases are applied, the first MOSFET 151 is turned on and the second MOSFET 153 is turned off for a half period and the first MOSFET 151 is turned off and the second MOSFET 153 is turned on for a remaining half period.

In detail, if the first MOSFET 151 is turned on and the second MOSFET 153 is turned off for the half period, the AC current flows to the wireless power transmitting apparatus 200 through the first MOSFET 151. In contrast, if the first MOSFET 151 is turned off and the second MOSFET 153 is turned on for the remaining half period, the AC current flows to the wireless power transmitting apparatus 200 through the second MOSFET 153 in the inverse direction. In particular, the inverse flow of the AC current may be interpreted as the AC current flows from the wireless power transmitting apparatus 200 to the second MOSFET 153.

In this manner, the first MOSFET 151 and the second MOSFET 153 are alternately operated in every half period to supply the AC power to the wireless power transmitting apparatus 200.

The above process will be described below by using a square wave.

Referring to FIG. 6, the AC signal A applied to the first MOSFET 151 in the form of a square wave and the AC signal B applied to the second MOSFET 153 in the form of a square wave are illustrated. A period of each AC signal A or B is assumed as T. The AC signals A and C have the same intensity and phase difference of a half period.

During a first section x of a first half-period (T/2), the AC signal A of a high level is applied to the first MOSFET 151 so that the first MOSFET 151 is turned on. Thus, the AC current flows to the wireless power transmitting apparatus 200 through the first MOSFET 151. At this time, the AC signal B of a low level is applied to the second MOSFET 151 so that the second MOSFET 153 is turned off.

In contrast, during a second section y of a remaining half-period (T/2), the AC signal B of a high level is applied to the second MOSFET 153 so that the second MOSFET 153 is turned on. Thus, the AC current flows to the wireless power transmitting apparatus 200 through the second MOSFET 153. At this time, the AC signal A of a low level is applied to the first MOSFET 151 so that the first MOSFET 151 is turned off.

Referring again to FIG. 5, the driver 155 can adjust the power supplied to the wireless power transmitting apparatus 200 by controlling the dead time of the AC signal applied to the first MOSFET 151 and the second MOSFET 153. The dead time may signify a time during which the first MOSFET 151 and the second MOSFET 153 are inactivated (or turned off). In detail, the dead time may be a time during which the signals of the low level are applied to the first MOSFET 151 and the second MOSFET 153, respectively, so that the first MOSFET 151 and the second MOSFET 153 are kept inactivated. Since the first MOSFET 151 and the second MOSFET 153 are inactivated during the dead time, the power may not be supplied to the wireless power transmitting apparatus 200.

The driver 155 may adjust the power supplied to the wireless power transmitting apparatus 200 by controlling the AC signal applied to the first MOSFET 151 and the second MOSFET 153 based on the power transmission state detected by the power transmission state detector 140.

According to one embodiment, the driver 155 may adjust the power supplied to the wireless power transmitting apparatus 200 based on the coupling state between the wireless power transmitting apparatus 200 and the wireless power receiving apparatus 300. In detail, if it is confirmed that the distance between the wireless power transmitting apparatus 200 and the wireless power receiving apparatus 300 becomes closer, the driver 155 may reduce the power supplied to the wireless power transmitting apparatus 200 by controlling the AC signal applied to the first MOSFET 151 and the second MOSFET 153 such that the wireless power transmitting apparatus 200 can transmit the reduced power to the wireless power receiving apparatus 300. In contrast, if it is confirmed that the distance between the wireless power transmitting apparatus 200 and the wireless power receiving apparatus 300 becomes far away, the driver 155 may increase the power supplied to the wireless power transmitting apparatus 200 by controlling the AC signal applied to the first MOSFET 151 and the second MOSFET 153 such that the wireless power transmitting apparatus 200 can transmit the increased power to the wireless power receiving apparatus 300.

According to one embodiment, the driver 155 can adjust the power supplied to the wireless power transmitting apparatus 200 by controlling the AC signal applied to the first MOSFET 151 and the second MOSFET 153 based on the measured intensity of current. For instance, if the intensity of current measured by the current sensor is increased, the controller 170 determines that the distance between the wireless power transmitting apparatus 200 and the wireless power receiving apparatus 300 gradually becomes closer, so the controller 170 controls the driver 155 to reduce the power supplied to the wireless power transmitting apparatus 200.

In this case, the driver 155 adjusts the time during which the AC signal applied to the first MOSFET 151 has a high level and the time during which the AC signal applied to the second MOSFET 153 has a low level in order to control the power supplied to the wireless power transmitting apparatus 200. In detail, the driver 155 may increase the dead time and reduce the power supplied to the wireless power transmitting apparatus 200 by adjusting the time during which the AC signal applied to the first MOSFET 151 has a high level and the time during which the AC signal applied to the second MOSFET 153 has a low level.

As the dead time is reduced, the time during which the first MOSFET 151 and the second MOSFET 153 are simultaneously inactivated is shortened so that the power supplied to the wireless power transmitting apparatus 200 can be increased. In contrast, as the dead time is increased, the time during which the first MOSFET 151 and the second MOSFET 153 are simultaneously inactivated is increased so that the power supplied to the wireless power transmitting apparatus 200 can be reduced.

In addition, the driver 155 can control the power supplied to the wireless power transmitting apparatus 200 by adjusting the time during which the AC signal applied to the first MOSFET 151 has a low level and the time during which the AC signal applied to the second MOSFET 153 has a high level.

Meanwhile, if it is necessary to supply maximum power to the wireless power receiving apparatus 300, the power supply apparatus 100 adjusts the dead time to zero. In this case, the first MOSFET 151 and the second MOSFET 153 are not activated, so the maximum power can be supplied to the wireless power transmitting apparatus 200.

Hereinafter, a method of adjusting the dead time will be described with reference to FIG. 7.

FIG. 7 shows an example to reduce the power supplied to the wireless power transmitting apparatus 200 by increasing the dead time.

Referring to FIG. 7, an AC signal C is a square wave signal applied to the first MOSFET 151, an AC signal D is a square wave signal applied to the second MOSFET 153, and an AC signal E is a square wave signal output from the AC power generator 150 and applied to the wireless power transmitting apparatus 200. One period of the AC signal C and AC signal D is assumed as T.

A first section is a duration where the high level signal is applied to the first MOSFET 151 and a second section b is a duration where the dead time is applied. That is, the time duration for applying the high level signal is reduced by the second section b during the half period (T/2). During the second section b, the first MOSFET 151 and the second MOSFET 153 are inactivated (turned off) so that power is not supplied to the wireless power transmitting apparatus 200.

A third section c is a duration where the high level signal is applied to the second MOSFET 153 and a fourth section d is a duration where the dead time is applied. That is, the time duration for applying the high level signal is reduced by the fourth section d during the half period (T/2). During the fourth section d, the first MOSFET 151 and the second MOSFET 153 are inactivated (turned off) so that power is not supplied to the wireless power transmitting apparatus 200.

As a result, the waveform of the AC power, which is output from the AC power generator 150 and supplied to the wireless power transmitting apparatus 200, may be equal to the waveform E shown in FIG. 7 and the power supplied to the wireless power transmitting apparatus 200 may be reduced corresponding to the dead time.

Description will be made below referring back to FIG. 5.

The controller 170 controls the overall operation of the power supply apparatus 100.

The controller 170 adjusts the operating time of the AC power generator 150 according to the power transmission state detected by the power transmission state detector 140 in order to control the power supplied to the wireless power transmitting apparatus 200. According to one embodiment, the controller 170 adjusts the operating time of the AC power generator 150 according to variation of intensity of current flowing through the power supply apparatus 100 in order to control the power supplied to the wireless power transmitting apparatus 200. The controller 170 may apply a power increase signal or a power reduction signal to the driver 155 based on the intensity of current measured by the power transmission state detector 140.

Upon receiving the power increase signal or the power reduction signal, the driver 155 applies the AC signal, in which the dead time is adjusted, to the first MOSFET 151 and the second MOSFET 153 to adjust the power supplied to the wireless power transmitting apparatus 200.

If the distance or the alignment position between the wireless power transmitting apparatus 200 and the wireless power receiving apparatus 300 has been changed, the power received in the wireless power receiving apparatus 300 is also changed, so it is necessary to adjust the transmitted power for the stable charging operation. In other words, if the distance between the wireless power transmitting apparatus 200 and the wireless power receiving apparatus 300 becomes far away or the position of the wireless power transmitting apparatus 200 is not aligned with the position of the wireless power receiving apparatus 300, the transmitted power is increased. Otherwise, the transmitted power is reduced to enable the constant power transmission.

In this manner, if the dead time is adjusted with respect to the internal AC signal of the AC power generator 150, the power supplied from the power supply apparatus 100 to the wireless power transmitting apparatus 200 can be adjusted, so that the power transmitted to the wireless power receiving apparatus 300 can be adjusted.

As described above, according to the embodiment, the dead time of the AC signal applied to the first MOSFET 151 and the second MOSFET 153 is adjusted without using the DC-DC converter, so the embodiment can reduce heat generation as compared with the related art where the power supplied to the wireless power transmitting apparatus 200 is adjusted by using the DC-DC converter. In addition, according to the embodiment, the DC-DC converter is not necessary so that the material cost for the DC-DC converter can be saved.

Further, the power loss caused by the DC-DC converter (about 10%) can be inhibited.

Hereinafter, the power control method of the power supply apparatus according to the embodiment will be described with reference to FIG. 8. In the following description, the contents described with reference to FIGS. 1 to 8 will be incorporated by reference.

The power transmission state detector 140 detects the power transmission state between the wireless power transmitting apparatus 200 and the wireless power receiving apparatus 300 (S101). According to one embodiment, the power transmission state detector 140 can detect the power transmission state by measuring the coupling state between the wireless power transmitting apparatus 200 and the wireless power receiving apparatus 300. The coupling state between the wireless power transmitting apparatus 200 and the wireless power receiving apparatus 300 may refer to the magnetic coupling state between the wireless power transmitting apparatus 200 and the wireless power receiving apparatus 300 and may be changed according to at least one of the distance, angle and alignment position between the wireless power transmitting apparatus 200 and the wireless power receiving apparatus 300. According to one embodiment, the power transmission state detector 140 may include the current sensor as described above.

The controller 170 checks whether there is variation in the power transmission state based on the detected power transmission state (S103). According to one embodiment, the power transmission state may be changed according to at least one of the distance, angle and alignment position between the wireless power transmitting apparatus 200 and the wireless power receiving apparatus 300. In other words, the power transmission state may be changed according to the coupling state between the wireless power transmitting apparatus 200 and the wireless power receiving apparatus 300 and the controller 170 may check whether the coupling state is changed into the first coupling state or the second coupling state. The first coupling state may have the stronger magnetic coupling between the wireless power transmitting apparatus 200 and the wireless power receiving apparatus 300 as compared with that of the second coupling state. For instance, if the distance between the wireless power transmitting apparatus 200 and the wireless power receiving apparatus 300 becomes closer, the second coupling state is changed into the first coupling state.

According to one embodiment, when the distance between the wireless power transmitting apparatus 200 and the wireless power receiving apparatus 300 becomes far away or when the magnetic coupling between the wireless power transmitting apparatus 200 and the wireless power receiving apparatus 300 is weakened due to the misalignment, the controller 170 may determine that the coupling state between the wireless power transmitting apparatus 200 and the wireless power receiving apparatus 300 is changed from the first coupling state to the second coupling state. In addition, when the distance between the wireless power transmitting apparatus 200 and the wireless power receiving apparatus 300 becomes closer or when the position of the wireless power transmitting apparatus 200 matches with the position of the wireless power receiving apparatus 300, the controller 170 may determine that the coupling state between the wireless power transmitting apparatus 200 and the wireless power receiving apparatus 300 is changed from the second coupling state to the first coupling state.

If there is variation in the power transmission state, the controller 170 may control the power supplied to the wireless power transmitting apparatus 200 according to the power transmission state (S105). According to one embodiment, if it is determined that the coupling state between the wireless power transmitting apparatus 200 and the wireless power receiving apparatus 300 is changed from the first coupling state to the second coupling state, the controller 170 may increase the power supplied to the wireless power transmitting apparatus 200. In addition, if it is determined that the coupling state between the wireless power transmitting apparatus 200 and the wireless power receiving apparatus 300 is changed from the second coupling state to the first coupling state, the controller 170 may reduce the power supplied to the wireless power transmitting apparatus 200.

Therefore, the wireless power receiving apparatus 300 can stably receive the power even if there is variation in the power transmission state between the wireless power transmitting apparatus 200 and the wireless power receiving apparatus 300, so the stable charging operation can be ensured.

Figure 9:
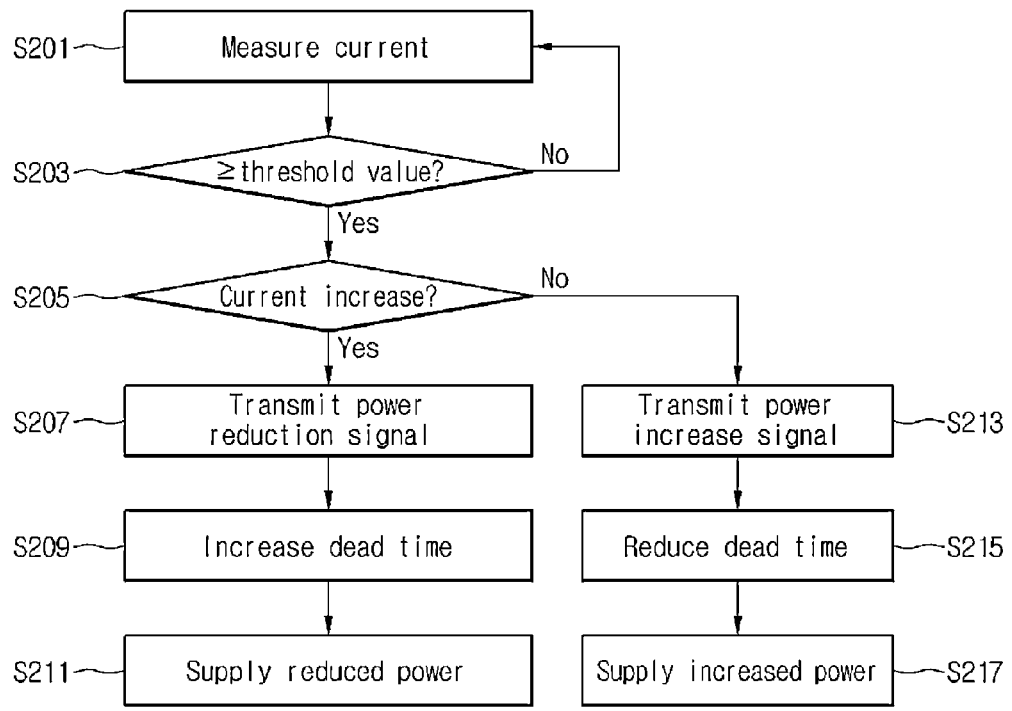
FIG. 9 is a flowchart showing a power control method of a power supply apparatus according to another embodiment.

FIG. 9 is a flowchart showing a power control method of a power supply apparatus according to another embodiment.

Figure 8:
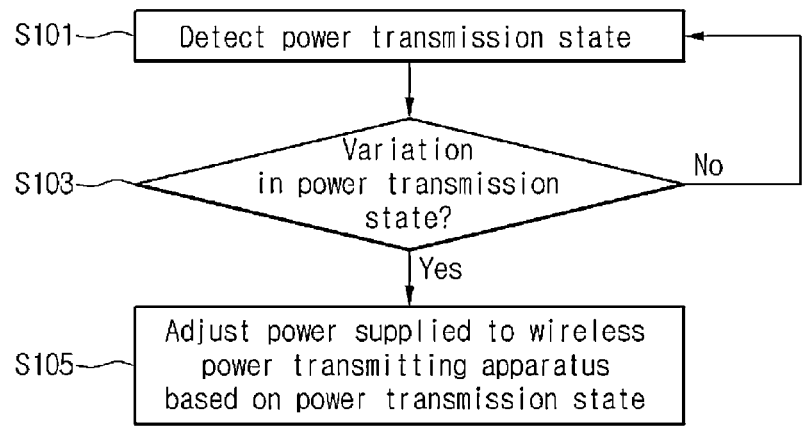
FIG. 8 is a flowchart showing a power control method of a power supply apparatus according to one embodiment.

In particular, FIG. 9 is a detailed flow chart of FIG. 8.

First, the power transmission state detector 140 may measure the intensity of current applied to the AC power generator 150 (S201). The power transmission state detector 140 may be the current sensor.

According to another embodiment, the power transmission state detector 140 may measure the intensity of current output from the AC power generator 150.

Then, the controller 170 determines whether the measured intensity of current is equal to or higher than the threshold vale (S203). The threshold value may refer to a minimum current value sufficient for detecting the wireless power receiving apparatus 300. That is, if the measured intensity of current is equal to or higher than the threshold vale, it is regarded that the wireless power receiving apparatus 300 is detected. If the measured intensity of current is less than the threshold vale, it is regarded that the wireless power receiving apparatus 300 is not detected.

If it is determined that the measured intensity of current is equal to or higher than the threshold vale, the controller 170 determines that the wireless power receiving apparatus 300 is detected, so the power transmission is possible.

After that, the controller 170 checks through the power transmission state detector 140 whether the intensity of current is increased (S205). The increase of the current intensity refers to the change of the coupling state between the wireless power transmitting apparatus 200 and the wireless power receiving apparatus 300 from the second coupling state to the first coupling state, that is, signifies that the distance between the wireless power transmitting apparatus 200 and the wireless power receiving apparatus 300 becomes closer. In this case, the alignment position of the wireless power transmitting apparatus 200 appropriately matches with the alignment position of the wireless power receiving apparatus 300 so that the power received in the wireless power receiving apparatus 300 may be increased.

If it is determined that the intensity of current is increased, the controller 170 transmits a power reduction signal to the driver 155 (S207). If the intensity of current is rapidly increased, the controller 170 may transmit the power reduction signal to the driver 155 to adjust the interval of the dead time corresponding to the intensity of current. In addition, if the intensity of current is slowly increased, the controller 170 may transmit the power reduction signal to the driver 155 to adjust the interval of the dead time corresponding to the intensity of current.

Upon receiving the power reduction signal from the controller 170, the driver 155 increases the dead time of the AC power signal supplied to the wireless power transmitting apparatus 200 (S209). The process for increasing the dead time of the AC power signal has been described with reference to FIGS. 5 to 7.

As the dead time of the AC power signal supplied to the wireless power transmitting apparatus 200 is increased, the power supply apparatus 100 supplies the reduced power to the wireless power transmitting apparatus 200 (S211). Since the reduced power is supplied to the wireless power transmitting apparatus 200, the power transmitted to the wireless power receiving apparatus 300 is also reduced, so the wireless power receiving apparatus 300 may receive the constant power, thereby inhibiting the unnecessary power consumption of the wireless power transmitting apparatus 200.

Meanwhile, if it is determined in step S105 that the intensity of current is reduced, the controller 170 transmits the power increase signal to the driver 155 (S213). The reduction of the current intensity may signify that the coupling state between the wireless power transmitting apparatus 200 and the wireless power receiving apparatus 300 is changed from the first coupling state into the second coupling state. If the intensity of current is rapidly reduced, the controller 170 may transmit the power increase signal to the driver 155 to adjust the interval of the dead time corresponding to the intensity of current.

Upon receiving the power increase signal from the controller 170, the driver 155 reduces the dead time of the AC power signal supplied to the wireless power transmitting apparatus 200 (S215). The process for reducing the dead time of the AC power signal has been described with reference to FIGS. 5 to 7.

As the dead time of the AC power signal supplied to the wireless power transmitting apparatus 200 is reduced, the power supply apparatus 100 supplies the increased power to the wireless power transmitting apparatus 200 (S217).

Since the increased power is supplied to the wireless power transmitting apparatus 200, the power transmitted to the wireless power receiving apparatus 300 is also increased, so the wireless power receiving apparatus 300 may receive the constant power even if the coupling state is deteriorated.

In this manner, according to the power control method of the power supply apparatus of the embodiment, the dead time of the AC power signal is adjusted according to the power transmission state between the wireless power transmitting apparatus 200 and the wireless power receiving apparatus 300, so that the power transmission efficiency can be improved.

The above method according to the embodiment may be prepared as a program for executing the method in the computer to be stored in the computer-readable recording medium and examples of the computer-readable recording medium include a ROM, a RAM, a CD-ROM, a magnetic tape, a floppy disk, an optical data storage, and the like and in addition, include a type of a carrier wave (e.g., transmission through the Internet).

The computer-readable recording media are distributed on computer systems connected through the network, and thus the computer-readable recording media may be stored and executed as the computer-readable code by a distribution scheme. In addition, functional programs, codes, and code segments for implementing the method can be easily deduced by programmer skilled in the art.

Further, as described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

According to the disclosure, the scheme of transmitting power using the electromagnetic coupling has a relatively low Q value and refers to the tightly coupling and the scheme of transmitting power using resonance has a relatively high Q value and refers to a loosely coupling.

What is claimed is:

1. A power supply apparatus of a wireless power transmitting apparatus wirelessly transmitting power to a wireless power receiving apparatus, the power supply apparatus comprising:
    a power supply to supply DC power;
    an oscillator to generate an AC signal having a predetermined frequency;
    an AC power generator to generate AC power using the AC signal and the DC power; and
    a current sensor to measure current flowing through the power supply apparatus,
    wherein the current flowing through the power supply apparatus is one of current applied to the AC power generator and current output from the AC power generator, and
    wherein the power supply apparatus controls an operating time of the AC power generator according to variation of the measured current flowing to adjust the power supplied to the wireless power transmitting apparatus when the measured intensity of current is equal to or higher than a threshold value that is a minimum current value sufficient for detecting the wireless power receiving apparatus,
    wherein the AC power generator comprises:
        a first MOSFET;
        a second MOSFET; and
        a driver applying AC signals having a same amplitude and opposite phases to the first MOSFET and the second MOSFET, respectively,
    wherein the driver adjusts a time during which the AC signal of a low level is applied to both of the first MOSFET and the second MOSFET,
    wherein the power supply apparatus increases the time during which the AC signal of the low level is applied to both of the first MOSFET and the second MOSFET when the measured intensity of current is increased,
    wherein, when the intensity of current is rapidly increased, an interval of the time is adjusted corresponding to the intensity of the current rapidly increasing,
    wherein, when the intensity of current is slowly increased, the interval of the time is adjusted corresponding to the intensity of the current slowly increasing;
    wherein the power supply apparatus reduces the time during which the AC signal of the low level is applied to both of the first MOSFET and the second MOSFET when the measured intensity of current is reduced, and
    wherein, when the intensity of current is rapidly reduced, the interval of the time is adjusted corresponding to the intensity of the current rapidly reducing.

2. The power supply apparatus of claim 1, wherein the power supply apparatus adjusts the operating time of the AC power generator based on a coupling state between the wireless power transmitting apparatus and the wireless power receiving apparatus wirelessly receiving the power from the wireless power transmitting apparatus.

3. The power supply apparatus of claim 1, wherein the power supply apparatus adjusts the operating time to increase the power supplied to the wireless power transmitting apparatus when a magnetic coupling between the wireless power transmitting apparatus and the wireless power receiving apparatus is reduced, and adjusts the operating time to reduce the power supplied to the wireless power transmitting apparatus when the magnetic coupling between the wireless power transmitting apparatus and the wireless power receiving apparatus is increased.

4. The power supply apparatus of claim 1, wherein the operating time is a time during which one of AC signals applied to the first MOSFET and the second MOSFET has a high level to supply the power to the wireless power transmitting apparatus.

5. The power supply apparatus of claim 1,
    wherein the driver adjusts a time during which the AC signal of a high level is applied to both of the first MOSFET and the second MOSFET.

6. The power supply apparatus of claim 1, wherein the power supply apparatus reduces the time during which the AC signal of the low level is applied to both of the first MOSFET and the second MOSFET when the magnetic coupling between the wireless power transmitting apparatus and the wireless power receiving apparatus is reduced, and increases the time during which the AC signal of the low level is applied to both of the first MOSFET and the second MOSFET when the magnetic coupling between the wireless power transmitting apparatus and the wireless power receiving apparatus is increased.

7. The power supply apparatus of claim 1, further comprising a power transmissions state detector to detect the coupling state.

* * * * *